United States Patent [19]

Cox

[11] 4,158,069
[45] Jun. 12, 1979

[54] ENRICHED WHEAT MACARONI

[76] Inventor: Duane S. Cox, 7049 Rhodes, Mackenzie, Mo. 63123

[21] Appl. No.: 839,186

[22] Filed: Oct. 4, 1977

[51] Int. Cl.² ............................................. A23L 1/16
[52] U.S. Cl. ..................................... 426/557; 426/656
[58] Field of Search ............................... 426/557, 656

[56] References Cited

U.S. PATENT DOCUMENTS

| | | | |
|---|---|---|---|
| 3,615,677 | 10/1971 | Schnarschmidt et al. | 426/557 |
| 3,663,232 | 5/1972 | Glabe | 426/557 |
| 3,762,931 | 10/1973 | Craig | 426/557 |
| 3,925,568 | 12/1975 | Roo et al. | 426/656 |
| 3,949,101 | 4/1976 | Murthy | 426/557 |
| 3,959,512 | 5/1976 | D'Alessandro et al. | 426/557 |
| 3,993,795 | 11/1976 | Mauron et al. | 426/656 |

OTHER PUBLICATIONS

Food and Drug Administration, Chapter 1 & 139.117, pp. 203-204.
Title 21, Food and Drugs & 172.320 pp. 368-370.

*Primary Examiner*—Raymond N. Jones
*Assistant Examiner*—Elizabeth A. Hatcher
*Attorney, Agent, or Firm*—Richard G. Heywood

[57] ABSTRACT

An enriched wheat macaroni product conforming to F.D.A. standard of identity regulations therefor, comprising a major portion of a milled wheat ingredient, minor portions of non-wheat protein ingredients including at least one milk fraction protein source, and a predetermined amount of L Lysine.

8 Claims, No Drawings

ENRICHED WHEAT MACARONI

BACKGROUND OF THE INVENTION

As used herein, the term "macaroni" includes the entire group of alimentary pastes or pasta products more commonly known by the terms spaghetti, macaroni, noodles, vermicelli and the like; and, as used herein, the term "enriched wheat macaroni" shall mean a macaroni product conforming to the F.D.A. standard of identity for "enriched wheat macaroni—with fortified protein", as set out in the 1977 revision of the Code of Federal Regulations in Title 21 CFR 139.117, and which otherwise qualifies as a "meat alternate" for a Type A School Lunch under U.S.D.A. regulations therefor, as set out in Title 7 CFR 210.10.

More specifically, Title 21 CFR 139.117 establishes a standard of identity for "enriched wheat macaroni—with fortified protein" and prescribed the necessary and permissive ingredient and nutritional specifications to meet the protein requirements set out therein. This F.D.A. code section requires that such enriched wheat macaroni products have a protein quantity of at least 20% protein by weight and a protein quality having a Protein Efficiency Ratio (PER) of at least 95% of casine or PER 2.375 as determined on the cooked food by prescribed F.D.A. official methods. [This standard of identity for "enriched wheat macaroni" is to be distinguished from the different and lower standard of identity set out in Title 21 CFR 139.110 et. seq. for regular or common macaroni which has a protein quantity of approximately 12% protein and a PER of approximately 1.80.] Among other things, the 21 CFR 139.117 standard of identity permits the use of food additives if such use is in conformity with regulations prescribed therefor, and Title 21 CFR 172.320 establishes the conditions under which amino acids (protein) may be added as food nutrients including the requirement that, if used, the additive(s) results in a PER of protein in the finished food product equivalent to casine or PER 2.50. In addition to setting minimum protein levels, the F.D.A. regulations further limit the maximum amount of protein in enriched wheat macaroni products to 25% and, if an amino acid food additive is used, the amount of that specific protein additive plus the amount of such protein naturally present in other ingredients cannot exceed established levels therefor.

In addition to meeting minimum and maximum protein and nutritional requirements for enriched wheat macaroni, it is important that such a product be compatible with known manufacturing equipment and processes, and it is also important that the finished food be marketable and palatable.

In the past many attempts have been made to formulate so-called "high protein" pasta products that will qualify as a "meat alternate" under government sponsored food programs including the Type A school lunch program, but prior to applicant's invention none of the pasta products offered to this market have been completely satisfactory and acceptable. Although other macaroni manufacturers have been designated by the U.S.D.A. as qualified sources for "meat alternate" enriched wheat macaroni, their products have not been in compliance with the regulations and/or the palatability and food quality of such products has been unacceptable from a consumer viewpoint. It is cheap and simple to increase the total crude protein quantity of a pasta to 20% by weight; and it is relatively simple and inexpensive to increase the protein quantity of a pasta to 20% and also improve the protein quality to 95% of casine (i.e. PER 2.375) as required by the basic F.D.A. regulation. However, it is difficult and expensive to increase the protein quantity and quality to conform to the regulations, and also produce a good consumer product having excellent color, texture, taste and cohesiveness.

In the prior art, the nature and desirable attributes of a good, high protein pasta are summarized in Murthy U.S. Pat. No. 3,949,101; which discusses some of the problems in the formulation and manufacture of pasta products and the preparation of food therefrom and which also purports to teach an improved and higher protein pasta formulation consisting of 84% to 95% semolina and 5% to 16% of undenatured whey solids containing 50% whey protein and 3% to 8% of soy protein isolate. The pasta formulation of Murthy also purports to have a protein efficiency ratio (PER) of about 2.4 which is approximately 95% of casine. However, the Murthy formulation is prepared by a process requiring drying for 34 hours at 100° F., which is much too long a time at too low a temperature to be commercially sound manufacturing practice and results in a product that subsequently cracks and breaks up and, accordingly, is unmarketable. In addition, the Murthy formulation has a dark yellow color and falls apart or lacks cohesiveness when cooked, thereby resulting in an unpalatable food product.

In the prior art, Craig et al U.S. Pat. No. 3,762,931 discloses a manufacturing process for macaroni and discusses at some length the background and parameters of sound macaroni manufacturing practice, particularly the importance and criticality of the drying steps (which is the principal problem with the Murthy pasta product just discussed). Craig et al teach the introduction of certain paste modifying agents into conventional macaroni mixes to develop improved mixing and extrusion characteristics with substantially reduced proportions of process water.

SUMMARY OF THE INVENTION

The principal object of the present invention is to provide an enriched wheat macaroni product that fully complies with the F.D.A. standard of identity for "enriched wheat macaroni—with fortified protein" and, accordingly, meets the U.S.D.A. requirements for use as a "meat alternate" in the Type A school lunch program.

Another object is to provide an enriched wheat macaroni product that comprises an elegant, palatable, high protein food.

Another object is to provide an improved pasta product exceeding the minimum high protein and nutritional requirements established for use as a "meat alternate" in school lunch programs, and which has good color, texture, cohesiveness and taste and all the attributes of the best pasta products.

Another object is to provide an enriched wheat macaroni product that is easily formulated and manufactured within the capability and capacity of existing conventional manufacturing equipment for pasta products.

Still another object of the invention is to provide an economical, high protein pasta product that will meet the market demands for a low cost, high energy, good tasting food product.

These and still other objects and advantages will become more apparent hereinafter.

DESCRIPTION OF THE PREFERRED EMBODIMENTS

The principal ingredient in all macaroni products is one or more milled wheat ingredients and such other ingredients that enable the finished food to meet certain specifications. In fine quality macaroni products, and particularly in formulating enriched wheat macaroni having a high protein quantity of at least 20% protein and a high protein quality of at least PER 2.375, a major portion of durham wheat or semolina (as the coarse fraction of durham wheat) is used as the principal protein ingredient. Semolina (which broadly includes durham wheat as used herein) contains about 13% protein by weight on a normal 13 percent moisture basis, but the PER of semolina is only about 0.6% to 0.8% whereby other protein enrichment sources are required to increase both the protein quantity and protein quality (i.e. PER) of the enriched wheat macaroni product.

All proteins are constituted from 23 amino acids, of which 8 amino acids are essential for the body to properly metabolize all protein foods, and these must be ingested since the body cannot produce them.

Lysine is the first limiting amino acid in that when it is not present in sufficient quantities to allow the other proteins to be fully metabolized, such other proteins will be used by the body as if a carbohydrate. According to the present invention, L Lysine in free form is added as an important ingredient even though also present in combined form in wheat and other protein sources thereby assuring that the enriched wheat macaroni product will be properly consumed and used as a protein. L Lysine and other amino acids are considered to be "food additives" under F.D.A. regulations, which also require that, if used, the finished macaroni product must have a PER of 2.50 and that the total Lysine present in free and combined forms cannot exceed 6.4% of the total protein in the product. Accordingly, even though L Lysine per se has no PER while increasing the minimum requirements therefor, the addition of a predetermined small percentage of L Lysine in the range of about 0.5% to about 1.0% is believed necessary in the present macaroni formulation.

In order to achieve the minimum protein quantity and protein quality levels required, additional high protein enrichment sources are included in the present formulation. Various protein source ingredients include:
- wheat derivative proteins, including wheat gluten, wheat germ, and farina meal;
- oilseed derivative proteins, including soya flour, soy protein concentrate, soy protein isolate, cottonseed meal and peanut meal;
- meal derivative proteins, including fish meal and torula yeast; and
- milk derivative proteins, including liquid milk, concentrated milk, evaporated milk, skim milk, dry milk, liquid whey, modified whey solids including undenatured whey protein and denatured whey protein, and calcium caseinate together with the group of other caseinates including sodium, potassium, magnesium, lithium and ammonium.

These protein source ingredients may be added in various combinations or, in some cases, alone to meet the protein requirements of the present macaroni product.

In addition to achieving minimum levels of protein quantity and protein quality, it is also important to produce an elegant, high quality macaroni product with all the best attributes of appearance, color, taste, firmness and cohesiveness and one which is easily prepared, extruded and dried with conventional equipment and procedures. Accordingly, although there is some latitude in the selection and substitution of the various protein ingredients set out, it has been discovered that improved enriched macaroni products are produced according to the specific preferred embodiments set out in Examples I–IV hereinafter.

It will be readily apparent that at least one milk fraction protein element is included in the present macaroni formulation, and preferably two different milk fraction protein ingredients are used. Denatured dried whey protein having a 35% to 50% whey protein with the balance being essentially lactose has been discovered to be an excellent protein source and also has a PER of about 3.2 to 3.4. Problems encountered with the drying of macaroni made with undenatured whey are overcome by the use of denatured whey, which does not hold onto the water molecule and does not crack and fall apart subsequent to drying. Denatured dried whey protein containing either 35% or 50% whey protein is commercially available from several manufacturers. Another preferred source of protein is calcium caseinate which has 95% protein and a good PER of about 2.5 to 2.8 and, in addition, the calcium content of the macaroni product is supplemented and calcium caseinate adds toughness and lightens the color of the product. Therefore, a combination of denatured dried whey solids and calcium caseinate is preferred in the macaroni formulation, but soy protein isolate or soy concentrate may be substituted for one of these milk fraction proteins.

Wheat gluten is also a useful ingredient in the preferred macaroni formulation. Wheat or gum gluten while having a low PER of 0.6 to 0.8 (the same as wheat) contains about 75% protein and adds toughness and good color to the macaroni product, but soy protein isolate or soy concentrate may be substituted as indicated in the examples. It should be understood that the protein enrichment ingredients may vary in amount by plus or minus 15% with the other ingredients and the semolina also varied in amount to compensate and still maintain a finished (cooked) food protein quantity of 20% to 25% and a protein quality of at least PER 2.5.

The preferred formulation also includes a small amount of about 0.10% of calcium hydroxide, thereby supplementing the calcium content.

The invention will be more fully understood by the following specific examples, in which the percentages given are by weight:

EXAMPLE I

A presently preferred formulation of enriched wheat macaroni is prepared having the following formulation:

| Ingredient | Percentage |
| --- | --- |
| Semolina | 88.35 |
| Dried whey (50% protein) | 5.60 |
| Calcium caseinate | 4.00 |
| Wheat gluten | 1.20 |
| L Lysine | 0.75 |
| Calcium hydroxide | 0.10 |

In addition, a conventional enrichment or "nutritional package" of thiamin, niacin, riboflavin and iron is added, and permissible additional ingredients may be added. The formulation is first dry-mixed and then wet-mixed with water in a conventional manner to prepare a dough, which is then extruded by conventional techniques to produce a macaroni product. This product permits the use of commercial drying times and temperatures in conventional equipment, i.e. about 6 hours at 125° F. to 140° F., and produces a product that is light yellow or golden and is firm with a fine brightness and luster. When cooked, the macaroni turns white, and retains its firmness or cohesiveness and has a good texture and tastes like macaroni should taste.

The finished food product has a protein quantity of approximately 22.6% and a protein quality exceeding PER 2.50, and a total L Lysine amount below 6.4% of total protein, thereby complying fully with F.D.A. and U.S.D.A. regulations for "enriched wheat macaroni—with fortified protein" and "meat alternate" status.

EXAMPLE II

Enriched wheat macaroni is also prepared having the following formulation:

| Ingredient | Percentage |
|---|---|
| Semolina | 85.65 |
| Dried whey (35% protein) | 8.00 |
| Calcium caseinate | 4.00 |
| Wheat gluten | 1.50 |
| L Lysine | 0.75 |
| Calcium hydroxide | 0.10 |

The nutritional package is added and this formulation is prepared, extruded and dried according to the method of Example I, and produces a firm or "tough" product that is light yellow or golden in color and which cooks white and retains its firmness or cohesiveness, and has a good texture and taste. This product meets F.D.A. and U.S.D.A. requirements for "enriched wheat macaroni" and "meat alternate" status.

EXAMPLE III

Enriched wheat macaroni is prepared having the following formulation:

| Ingredient | Percentage |
|---|---|
| Semolina | 85.65 |
| Dried whey (35% protein) | 8.00 |
| Calcium caseinate | 4.00 |
| Soy protein isolate | 1.50 |
| L Lysine | 0.75 |
| Calcium hydroxide | 0.10 |

The nutritional package is added and this formulation is prepared, extruded and dried according to the method of Example I, and produces a macaroni product that meets F.D.A. and U.S.D.A. requirements for "enriched wheat macaroni" and "meat alternate" status.

EXAMPLE IV

Enriched wheat macaroni is prepared having the following formulation:

| Ingredient | Percentage |
|---|---|
| Semolina | 88.45 |
| Dried whey (50% protein) | 5.60 |
| Calcium caseinate | 2.00 |
| Soy protein isolate | 2.00 |
| Wheat gluten | 1.50 |

-continued

| Ingredient | Percentage |
|---|---|
| L Lysine | 0.75 |

The nutritional package is added and this formulation is prepared, extruded and dried according to the method of Example I, and produces a macaroni product that meets F.D.A. and U.S.D.A. requirements for "enriched wheat macaroni" and "meat alternate" status.

EXAMPLE V

Enriched wheat macaroni is prepared having the following formulation:

| Ingredient | Percentage |
|---|---|
| Semolina | 78.00 |
| Dried whey (35% protein) | 21.25 |
| L Lysine | 0.75 |

The nutritional package is added and this formulation is prepared, extruded and dried according to the method of Example I, and produces a macaroni product that meets F.D.A. and U.S.D.A. requirements for "enriched wheat macaroni" and "meat alternate" status.

EXAMPLE VI

Enriched wheat macaroni is prepared having the following formulation:

| Ingredient | Percentage |
|---|---|
| Semolina | 92.00 |
| Calcium caseinate | 7.25 |
| L Lysine | 0.75 |

The nutritional package is added and this formulation is prepared, extruded and dried according to the method of Example I, and produces a macaroni product that meets F.D.A. and U.S.D.A. requirements for "enriched wheat macaroni" and "meat alternate" status.

What is claimed is:

1. An enriched wheat macaroni product comprising a major portion of about 78% to about 92% of semolina as the principal protein source, a minor portion of another protein source including at least 2.0% of one milk fraction protein ingredient, and an added amount of about 0.5% to about 1.0% of the amino acid L Lysine, such added amount of said amino acid being in addition to the amount thereof naturally present in free and combined form in the other ingredients, whereby said product in finished cooked form has a protein quantity of at least 20% and a protein quality of at least PER 2.50.

2. The enriched wheat macaroni product according to claim 1 wherein said milk fraction protein ingredient is selected from a group consisting of denatured dried whey solids containing 35% to 50% whey protein and a caseinate selected from a class of calcium, sodium, potassium, magnesium, lithium and ammonium.

3. The enriched wheat macaroni product according to claim 1 wherein said milk fraction protein ingredient comprises from about 5.5% to about 21.5% of denatured whey solids containing 35% to 50% whey protein.

4. The enriched wheat macaroni product according to claim 1 wherein said milk fraction protein ingredient comprises from about 2.0% to about 7.5% calcium caseinate.

5. The enriched wheat macaroni product according to claim 1 wherein said other protein source comprises from about 5.5% to about 8.0% denatured whey solids containing 35% to 50% whey protein and about 2.0% to about 4.0% calcium caseinate.

6. The enriched wheat macaroni product according to claim 5 including about 1.2% to about 1.5% wheat gluten and about 0.10 calcium hydroxide.

7. An enriched wheat macaroni product comprising about 78% to about 92% semolina as its principal protein ingredient; from about 2.0% to about 12.0% of at least one milk fraction protein ingredient; from about 1.5% to about 19.5% of at least one non-wheat and non-milk fraction protein ingredient selected from a group consisting of torula yeast, fish meal, cottonseed meal, peanut meal, soy flour, soy concentrate and soy isolate; and an added amount of about 0.5% to 1.0% of the amino acid L Lysine; said enriched wheat macaroni product is finished, cooked form having a total protein quantity of 20% to 25%, a total protein quality of at least PER 2.50, and the added amount of L Lysine plus the amount thereof naturally present in free and combined form in the other ingredient does not exceed 6.4% by weight of the total protein.

8. An enriched wheat macaroni product consisting essentially of a mixture of about 88.45% semolina, about 5.60% of denatured dried whey solids containing 50% whey protein, about 4.00% calcium caseinate, about 1.20% wheat gluten and an amount of about 0.75% L Lysine in addition to the amount thereof naturally present in free and combined form in the other ingredients, whereby said product in finished cooked form has a protein quantity of at least 20% and a protein quality of at least PER 2.50.

* * * * *

UNITED STATES PATENT OFFICE
CERTIFICATE OF CORRECTION

Patent No. 4,158,069　　　　　　　　Dated June 12, 1979

Inventor(s) Duane S. Cox

It is certified that error appears in the above-identified patent and that said Letters Patent are hereby corrected as shown below:

Column 8, line 2, "is" should read --in--.

Column 8, line 12, before "amount" insert --added--.

Signed and Sealed this

Second Day of October 1979

[SEAL]

Attest:

RUTH C. MASON
*Attesting Officer*

LUTRELLE F. PARKER
*Acting Commissioner of Patents and Trademarks*